US007053800B2

(12) United States Patent
Fisher-Jeffes

(10) Patent No.: US 7,053,800 B2
(45) Date of Patent: May 30, 2006

(54) APPARATUS AND METHOD FOR GENERATING A CODE MASK

(75) Inventor: Timothy Fisher-Jeffes, Cambridge (GB)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/487,637

(22) PCT Filed: Aug. 22, 2002

(86) PCT No.: PCT/GB02/03873

§ 371 (c)(1), (2), (4) Date: Oct. 13, 2004

(87) PCT Pub. No.: WO03/019807

PCT Pub. Date: Mar. 6, 2003

(65) Prior Publication Data

US 2005/0044120 A1 Feb. 24, 2005

(30) Foreign Application Priority Data

Aug. 22, 2001 (GB) ................................ 0120434.6

(51) Int. Cl.
*H03M 7/00* (2006.01)
*G06F 7/58* (2006.01)

(52) U.S. Cl. .......................... 341/50; 341/51; 708/252

(58) Field of Classification Search ............ 341/50–60, 341/173, 187; 375/1, 140, 130; 380/28, 380/49, 33; 714/252, 739

See application file for complete search history.

(56) References Cited

U.S. PATENT DOCUMENTS

| | | | | |
|---|---|---|---|---|
| 4,493,046 A * | 1/1985 | Watanabe | ................... | 708/252 |
| 5,046,036 A * | 9/1991 | Tezuka | ....................... | 708/253 |
| 5,057,837 A * | 10/1991 | Colwell et al. | ............... | 341/55 |
| 5,228,054 A | 7/1993 | Rueth et al. | | |
| 5,532,695 A | 7/1996 | Park et al. | | |
| 5,758,104 A * | 5/1998 | Gujral et al. | ............... | 710/107 |
| 5,926,070 A * | 7/1999 | Barron et al. | ............... | 708/250 |
| 6,282,230 B1 | 8/2001 | Brown et al. | | |
| 6,567,017 B1 * | 5/2003 | Medlock et al. | .............. | 341/50 |

FOREIGN PATENT DOCUMENTS

| | | |
|---|---|---|
| EP | 0994573 | 4/2000 |
| WO | WO 01/50239 | 7/2001 |

* cited by examiner

*Primary Examiner*—Rexford Barnie
*Assistant Examiner*—Lam T. Mai
(74) *Attorney, Agent, or Firm*—Wolf, Greenfield & Sacks, P.C.

(57) ABSTRACT

A new output mask for a m-sequence generator is produced by modulo-2 summing a number of intermediate masks. The intermediate masks are produced by shifting a shift template by amounts corresponding to offsets of set bits in an existing output mask. If an intermediate mask contains set bits beyond its portion corresponding to the new output mask, then they are wrapped back.

15 Claims, 6 Drawing Sheets

APPARATUS AND METHOD FOR GENERATING A CODE MASK

The invention relates to methods of, and apparatus for, code generation. In particular, the invention relates to methods of, and apparatus for, generating output masks for code generators.

In telecommunications, pn (pseudonoise) sequences that are also m-sequences (maximal length sequences) are commonplace, for example in the construction of Gold sequences used to scramble and descramble signals.

FIG. 1 illustrates a m-sequence generator 10 using the primitive (over Golay Field order 2) polynominal $1+x^7+x^{18}$. The generator 10 comprises an 18 element shift register. The input to the first element 12 of the shift register is provided by performing an exclusive-or operation on the outputs of the 0th and 7th elements of the register. The m-sequence can be read from the shift register by combining in an exclusive-OR (XOR) operation the outputs of a combination of the shift register elements. The elements selected for the combination can be any predefined combinations of elements. In the case of FIG. 1, the output of the shift register is simply the output of its 0th element. (The combination of elements forming the output will be called the output mask). Any certain combinations of elements can be used in the XOR operation, each combination corresponding to reading the m-sequence from a different point in its cycle. However, it can be difficult to determine which combinations produce the desired shifts.

According to one aspect, the invention provides a method of creating a new output mask for a m-sequence generator, comprising creating an intermediate mask for each bit set in an existing output mask and performing modulo-2 summation on all the intermediate masks produced to create the new output mask, wherein each intermediate mask is created by shifting a shift template by an offset equal to the offset of the corresponding set bit in the existing output mask.

The invention also consists in apparatus for creating a new output mask for a m-sequence generator comprising generating means for generating an intermediate mask for each bit set in an existing output mask and combining means for performing modulo-2 summation on all the intermediate masks produced to create the new output mask, wherein the generating means produces each intermediate mask by shifting a shift template by an offset equal to the offset of the corresponding set bit in the existing output mask.

Of course, it will be apparent that there may be just one set bit in the existing output mask, in which case the single intermediate mask produced is used to form the new output mask.

In one embodiment, each intermediate mask comprises an aligned portion aligned with the new output mask and the new output mask is produced through modulo-2 summation of all the aligned portions. If an intermediate mask has beyond its aligned portion an excess portion containing one or more set bits, then preferably said one or more excess portion set bits are used to influence the effect of the intermediate mask on the new output mask. The one or more excess portion said bits can be used to adjust the new output mask after or at the same time as their intermediate mask takes part in said summation. Alternatively, the one or more excess portion set bits may be used to adjust their intermediate mask before it takes part in said summation. In one embodiment, the influence of one or more excess portion set bits is determined by the nature of a feedback arrangement in the generator.

The invention has been expressed above in terms of a method for creating a new output mask for a m-sequence generator. It should be noted that the invention also extends to computer programmes (however embodied) for performing such methods.

By way of example only, certain embodiments of the invention will now be described with reference to the accompanying figures, in which.

A m-sequence generator can be described using two mask words, each having a number of bits equal to the number of elements in the shift register upon which the m-sequence generator is based. Indeed, each element in the shift register has a respective bit in each of the mask words. In accordance with the prevalent bit significance convention, the rightmost bit in each mask is the 0th or least significant bit (lsb) of the mask word and the leftmost bit in each mask word is the most significant bit (msb).

Figure 1:
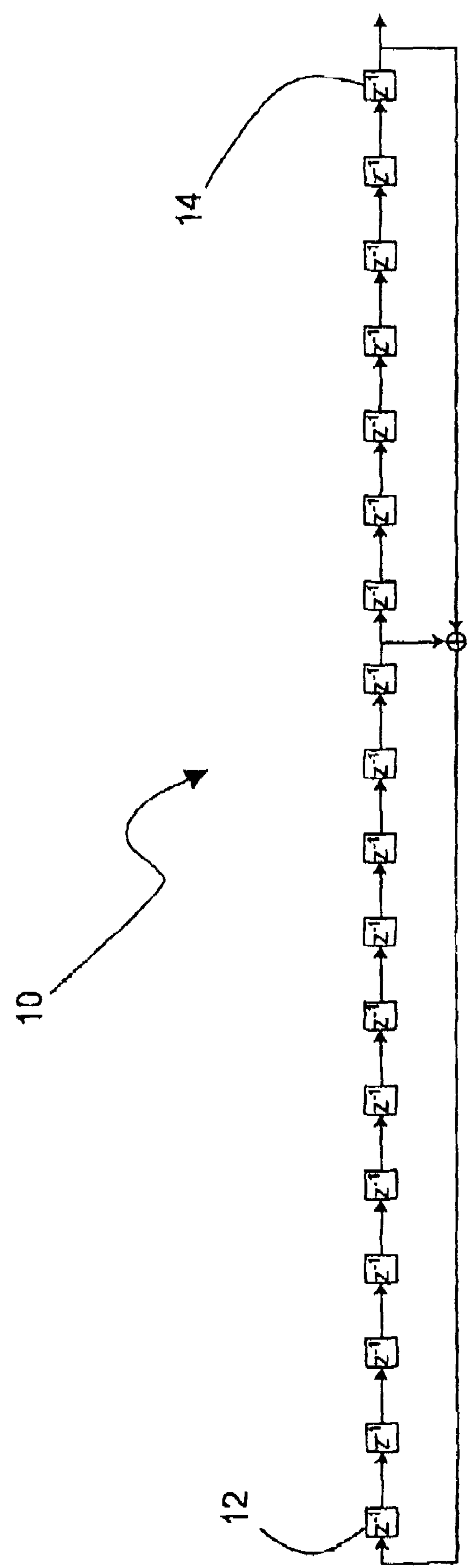
FIG. 1 is a schematic diagram of a m-sequence generator.

The two mask words are the output mask O and the feedback mask F. The output mask has bits set at only those positions corresponding to shift elements whose outputs are combined through an XOR operation to produce the output of the generator. The feedback mask has bits set at only those positions corresponding to shift elements whose outputs are combined through an XOR operation to produce the input to the first element of the shift register. In the case of the generator shown in FIG. 1:

O=000000000000000001

F=000000000010000001

As described earlier, the shift elements contributing to the output signal of a m-sequence generator can be varied in order to time shift the output m-sequence. If the output mask is $O_{current}$ and a time shift is applied, then the output mask becomes $O_{new}$ to specify the elements that contribute to the time shifted m-sequence. It will be apparent that where the shift register contains n elements $2^n-1$ possible time shifts can be applied, i.e. given any arbitrary $O_{current}$ there are $2^n-1$ possible $O_{new}$, each corresponding to a different time shift.

When $O_{current}$ has just its lsb set (i.e. the m-sequence is simply taken from the output of the final shift element) it shall be known as $O_{end}$. This embodiment uses the series of $2^n-1$ possible updated output masks that can arise from time shifting $O_{end}$ as a set of shift templates in the calculation of an updated output mask $O_{new}$ corresponding to the application of some arbitrary forward time shift to some arbitrary current output mask $O_{current}$. To calculate $O_{new}$ for a forward shift of c clock cycles from some arbitrary $O_{current}$, a shift template $S_c$ is selected which corresponds to the updated output mask for the application of a c cycle forward shift applied to $O_{end}$.

For example, to calculate $O_{new}$ for a 6 cycle forward shift from some arbitrary $O_{current}$, the selected shift template is $S_6$, which is the result of performing a 6 cycle forward shift on $O_{end}$. In terms of the n=18 stage register shown in FIG. 1, this example becomes:

$O_{end}$=000000000000000001

$S_6$=000000000001000000

Once the applicable shift template $S_c$ has been selected, it is applied to $O_{current}$ to generate one or more intermediate masks. For each bit that is set in $O_{current}$ an intermediate mask $I_p$ is generated, where p denotes the offset of the bit from the least significant end of $O_{current}$. The process of generating an intermediate mask $I_p$ will now be discussed.

The first step in generating $I_p$ is to offset $S_c$ by p bits from its least significant end. Except where c=0, $I_p$ will contain more than n bits (where n is the number of elements in the m-sequence generator's shift register). The portion of $I_p$ lying beyond its n least significant bits shall be known as the excess word $E_p$. If $E_p$ contains no set bits (or if there is no $E_p$), then $I_p$ is complete. Otherwise, the set bits in $E_p$ need to be processed because since they lie beyond the n lsbs of $I_p$ they would be meaningless in the context of a n bit $O_{new}$.

For each bit that is set in $E_p$, a wrap-back mask $W_{pq}$ is generated, where q denotes the offset of the bit from the least significant end of $E_p$. $W_{pq}$ is produced by offsetting F by q bits from its least significant end. When all the wrap-back masks have been calculated, $E_p$ is discarded leaving $I_p$ with just its n lsbs. Next, the wrap-back mask(s) are summed using modulo-2 addition with the truncated $I_p$ to produce an updated $I_p$. If the updated version of $I_p$ contains more than n bits, its excess word $E_p$ must again be processed to update $I_p$, and this loop through $E_p$ and $W_{pq}$ is re-iterated until an updated $I_p$ is produced which either has no $E_p$ or which has no bits set in its $E_p$. Once $E_p$ or the presence of set bits in $E_p$ is eliminated, $I_p$ is completed.

Once all of the $I_p$ have been calculated, they are combined using modulo-2 summation to produce $O_{new}$ Some examples of this procedure will now be given with reference to FIGS. 2, 3 and 4. These examples relate to the generator shown in FIG. 1 (n=18).

Figure 2:
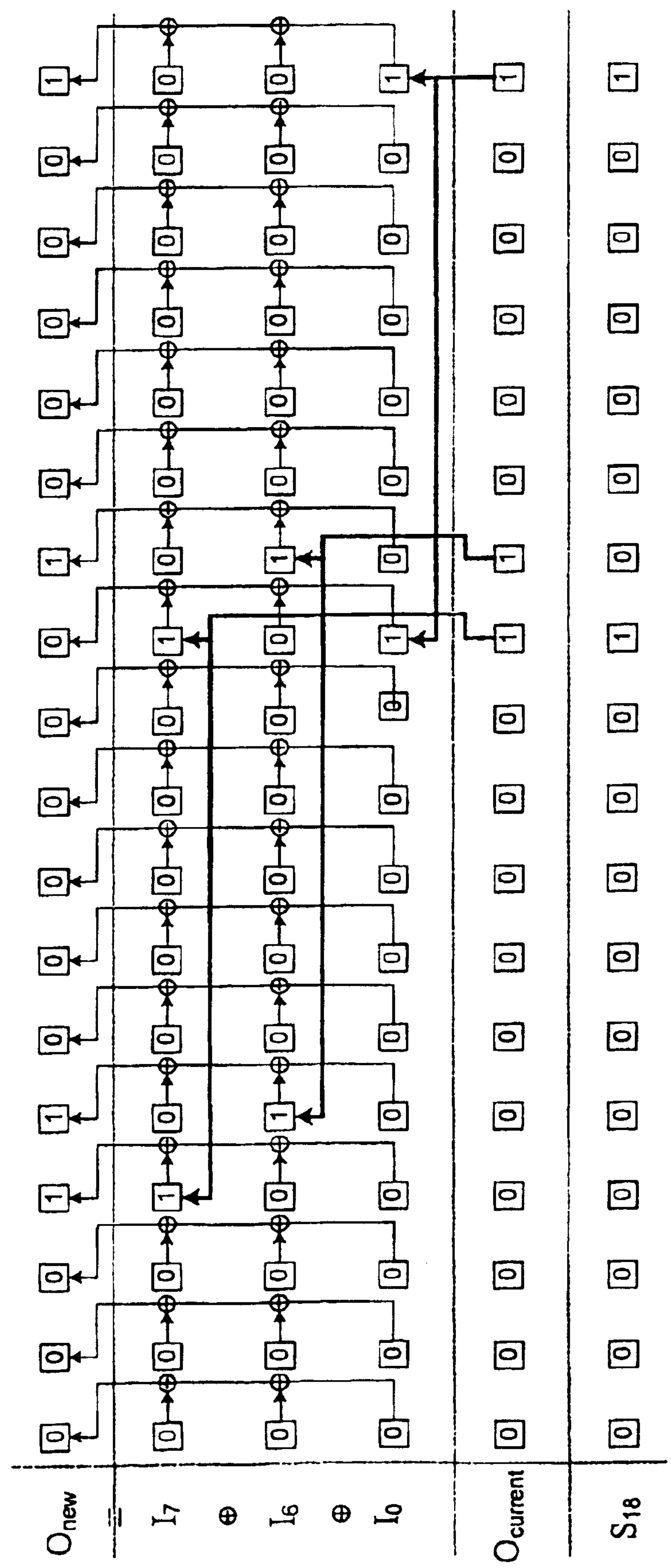
FIG. 2 is a first example of a calculation of an updated output mask.

In FIG. 2, a forward time shift of 18 cycles is applied to $O_{current}$ of 000000000011000001. $S_{18}$ is 000000000010000001. $O_{current}$ has bits set at offsets at p=0, 6 and 7 so $I_0$, $I_6$ and $I_7$ are produced by shifting $S_{18}$ by the requisite offsets, as shown by the bold arrows in FIG. 2. None of the intermediate masks contain any set bits beyond its 18 lsbs and therefore no wrap-back masks are required. The intermediate masks are simply combined by modulo-2 addition (equivalent to a bitwise XOR operation) to produce $O_{new}$. This can be seen by performing a XOR operation on each column of the three rows $I_0$, $I_6$, $I_7$ in FIG. 2.

Figure 3:
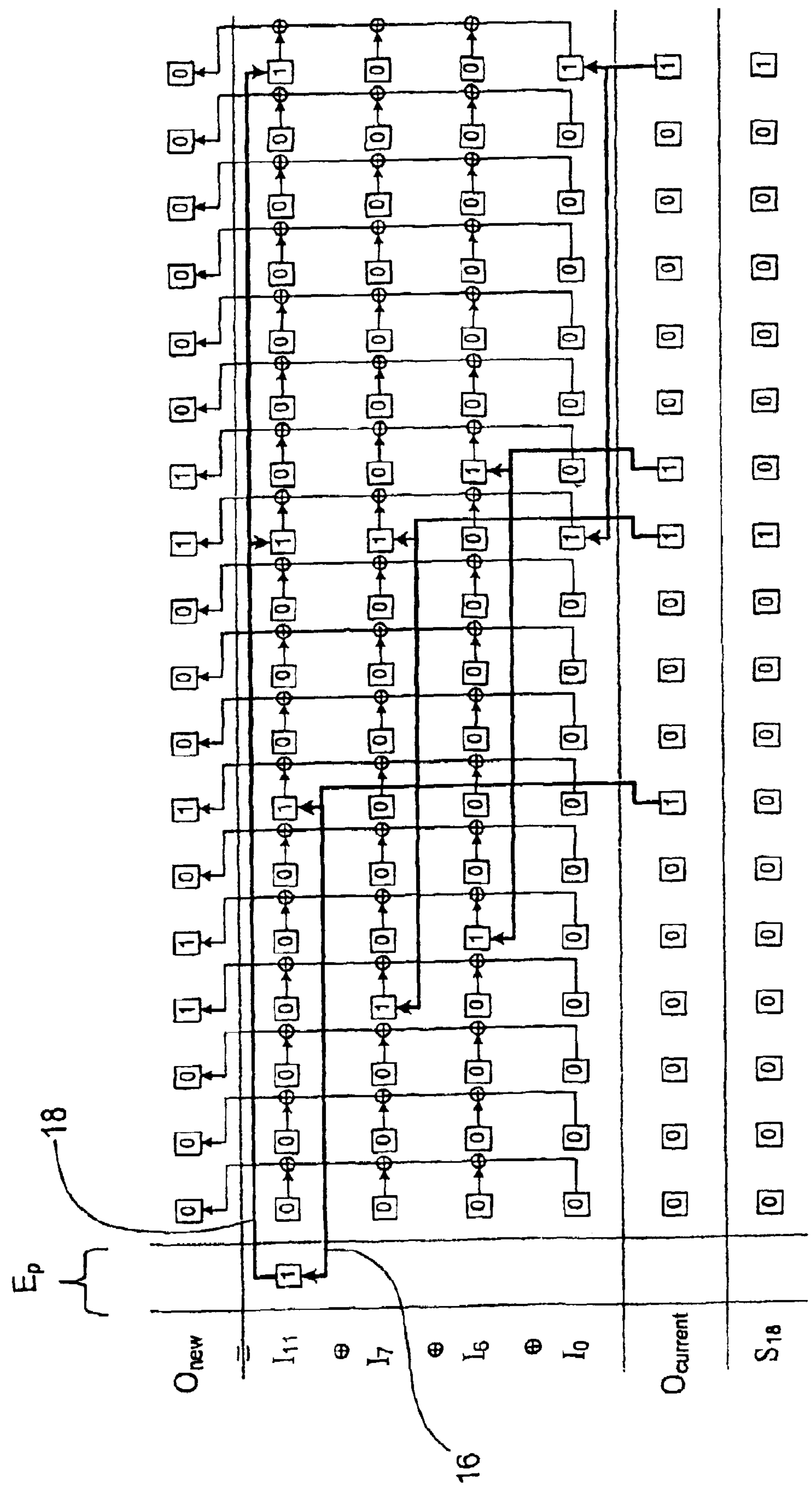
FIG. 3 is a second example of a calculation of an updated output mask.

In FIG. 3, a forward time shift of 18 cycles is applied to an $O_{current}$ of 000000100011000001. $O_{current}$ has bits set at offsets of p=0; 6, 7 and 11 so $I_0$, $I_6$, $I_7$ and $I_{11}$ are calculated. $I_0$, $I_6$ and $I_7$ are calculated as in the FIG. 2 example. However, the generation of $I_{11}$ involves a wrap-back mask. The first step in generating $I_{11}$ involves offsetting $S_{18}$ by 11 bits, as indicated by bold arrow 16. At this point $I_{11}$ contains an excess word $E_{11}$ containing a set bit at an offset of q=0 in the excess word. This bit therefore gives rise to a wrap-back mask $W_{11,0}$ which is the feedback mask offset by q=0 bits to the left, i.e. $W_{11,0}$ is 000000000010000001. The wrap-back mask $W_{11,0}$ is then modulo-2 summed with the n=18 lsbs of $I_{11}$ ($E_{11}$ having been discarded), as shown by bold arrow 18. Now, none of the $I_p$ contain any set bits outside their n=18 lsbs so the $I_p$ can be modulo-2 summed to produce $O_{new}$.

Figure 4:
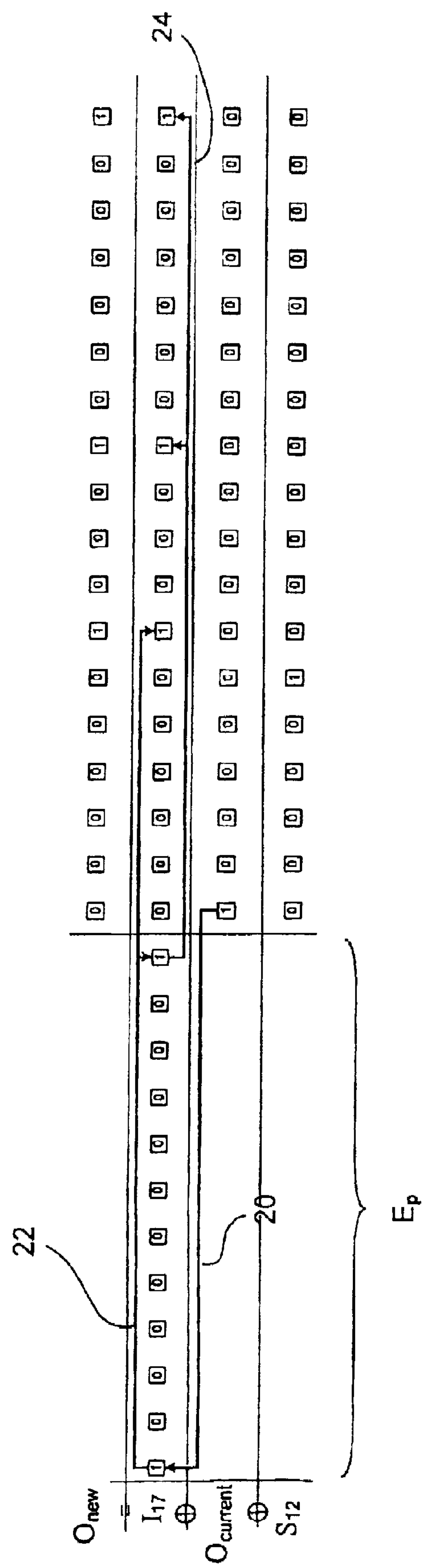
FIG. 4 is a third example of a calculation of an updated output mask.

In FIG. 4, a forward time shift of 12 cycles is applied to an $O_{current}$ 100000000000000000. $O_{current}$ contains only one set bit at an offset of p=17 and so only $I_{17}$ is generated. As shown in FIG. 4 $S_{12}$ is 000001000000000000 and this is offset by 17 bits to the left (as shown by bold arrow 20) as the first step in generating $I_{17}$. At this stage $I_{17}$, is a 30 bit word with only its msb set. The excess word for $I_{17}$ is $E_{17}$=100000000000. The set bit at an offset of q=11 in $E_{17}$ triggers the generation of wrap-back mask $W_{17,11}$ by applying an offset of q=11 to the feedback mask F, i.e. $W_{17,11}$ is 00000000001000000100000000000. $E_{17}$ is then discarded and $W_{17,11}$ is modulo-2 summed as indicated by bold arrow 22 with the n=18 bit truncated version of $I_{17}$. However, $I_{17}$ now contains again a set bit beyond its 18 lsbs, at bit position p=18. Thus $I_{17}$, once more has an excess word $E_{17}$ which must be processed via the creation of one or more wrap-back masks $W_{17,q}$. Now, $E_{17}$ is 1 and so q=0 which means that wrap-back mask $W_{17,0}$=000000000010000001 is generated and this is an unshifted version of F (because q=0). $E_{17}$ is again discarded and $W_{17,0}$ is then modulo-2 summed (as indicated by bold arrow 24) with the n=18 bit truncated version of $I_{17}$. The version of $I_{17}$ thus created has no set bits beyond its n=18 lsbs and so it is complete. In the absence of other $I_p$, $I_{17}$ merely becomes $O_{new}$.

FIG. 5 illustrates a logic circuit for performing the method of this embodiment, and is arranged to time shift the m-sequence output by a generator based on an n=18 shift register.

Figure 5A:
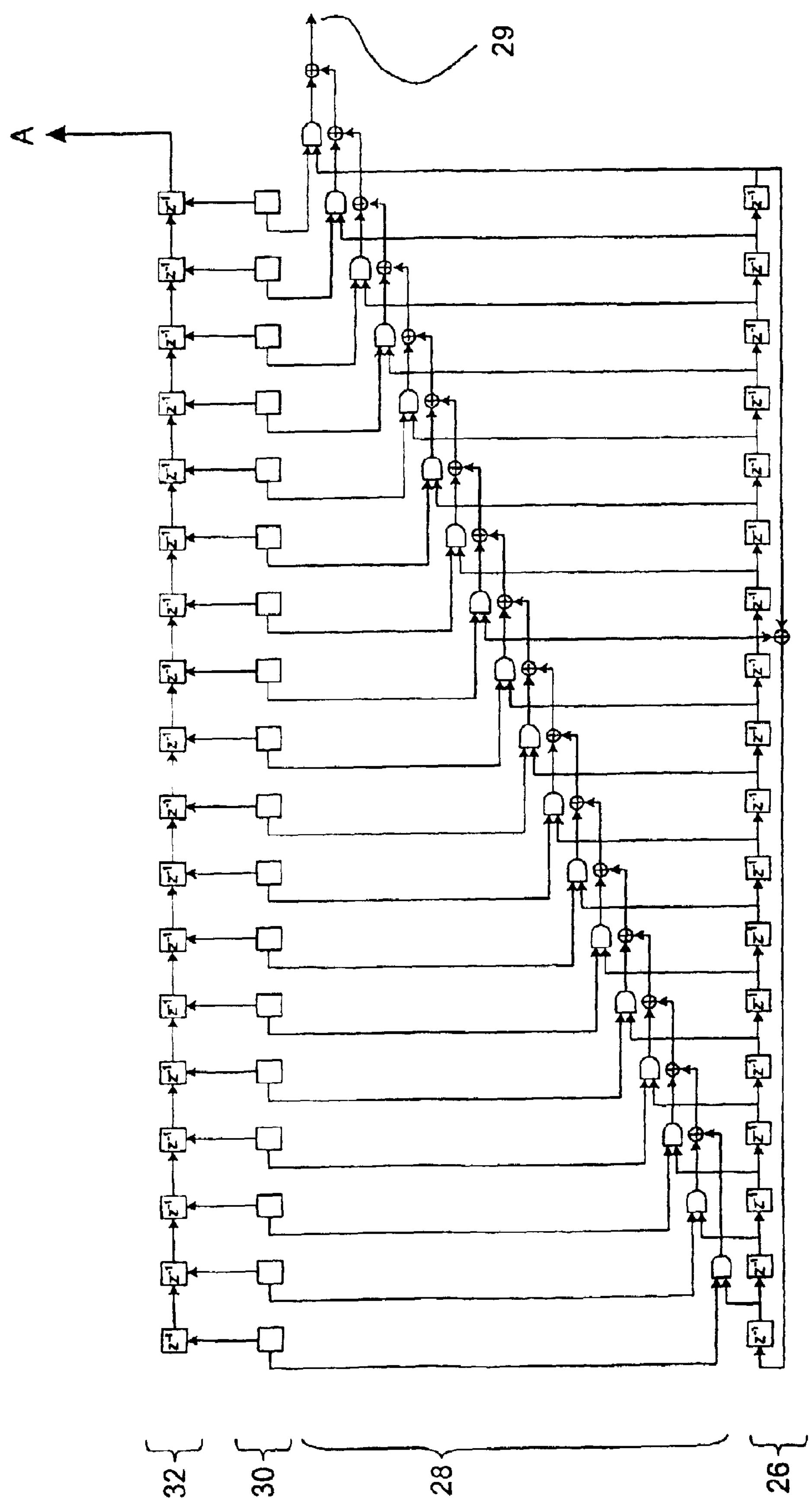
FIG. 5 is a schematic diagram of a logic circuit for updating an output mask.

In FIG. 5*a*, the m-sequence generator 26 can bee seen. A network 28 of AND and XOR gates operates on the outputs of the elements of the shift register in generator 26 in order to produce the output m-sequence at node 29. The AND gates of the network 28 act as selectors to determine whether or not the outputs the shift elements of the generator 26 participate in the XOR operation to produce the output 29. In turn, the AND gates of the network 29 are controlled by a row of registers 30 across which $O_{current}$ is stored. For example, when $O_{current}$ is $O_{end}$, only the rightmost AND gate in network 28 can output a "logic-high" bit and thus only the output of the final shift element of the register 26 is used to produce the output 29. When it is decided to update $O_{current}$ to $O_{new}$, $O_{current}$ is loaded in parallel into the elements of shift register 32. Register 32 is then clocked to produce signal A which produces $O_{new}$, as will now be described with reference to FIG. 5*b*.

Figure 5B:
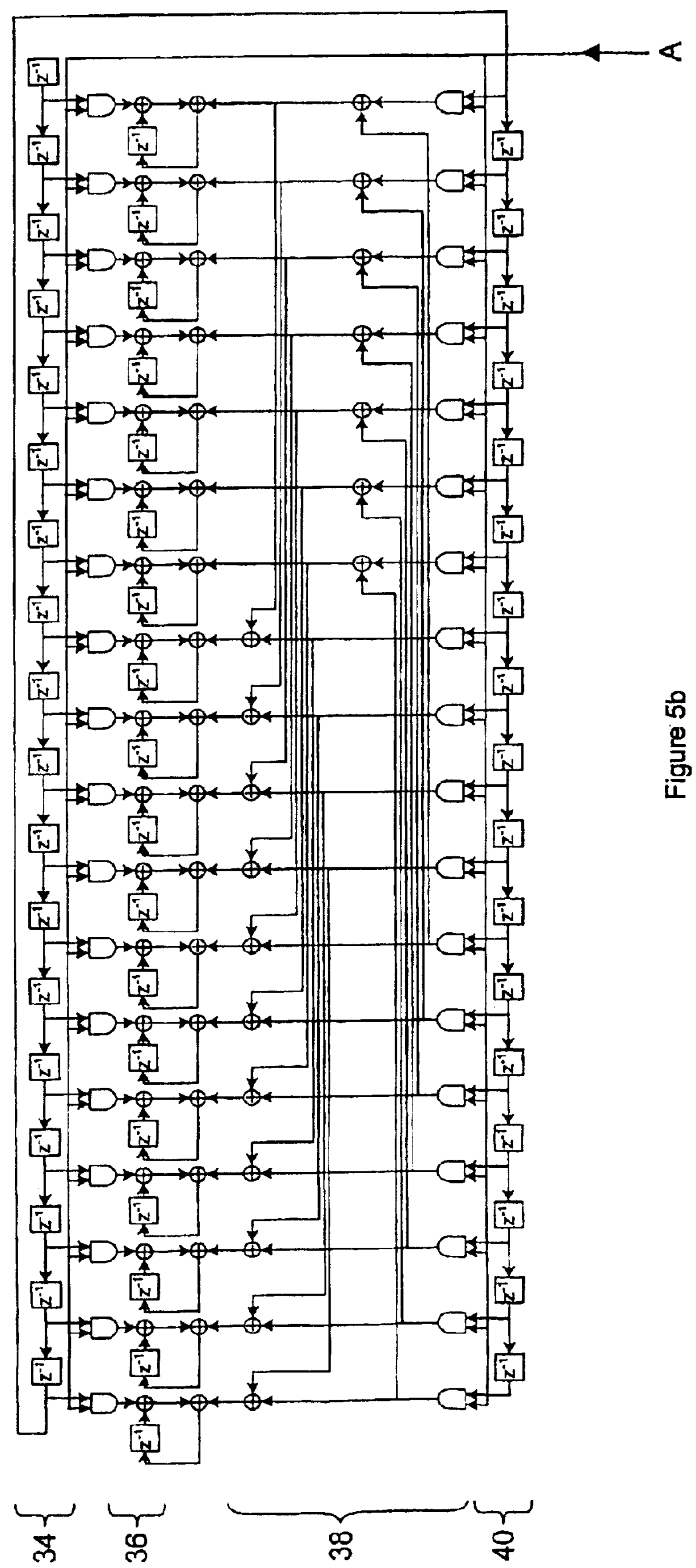

In FIG. 5*b*, $S_c$ is initially stored in shift register 34 and as the system clock advances, $S_c$ is shifted along shift register 40. The updated output mask $O_{new}$ is accumulated in the set of storage elements 36, each of which is arranged in a modulo-2 accumulation loop. When permitted by the AND gates shown in FIG. 5*b*, the elements 36 accumulate bits passed to them from register 34 and from (via wrap-back network 38) register 40. The wrap-back network is a configuration of XOR gates which allows the circuit to produce the correct $O_{new}$ result when the $I_p$ have excess words $E_p$ containing set bits. All of the AND gates are controlled by the signal A, which is the train of $O_{current}$ values stored in register 32. Thus only when A is set to "logic-high" will the storage elements 36 be updated.

When $O_{current}$ has been clocked out of the register 32, the elements 36 contain $O_{new}$ which can then be loaded into the registers 30 to update the output mask of the generator 26.

The process of calculating $O_{new}$ can be made more efficient by providing a series of shift templates $S_z$ corresponding to shifts in powers by two, i.e. $z=2^a$ where a =0, 1, 2, 3 . . . 17. A shift by an arbitrary amount, c, can be decomposed into the relevant combination of the members of the set defined by $S_z$. For example, to perform a shift by c=9 bits, $S_1$ (a=0) could be applied followed by $S_8$ (a=3). The use of the set of templates $S_z$ provides that the time taken to calculate $O_{new}$ for an arbitrary shift c using an n element shift register then becomes nÑlog₂cÒ clock cycles.

At the cost of replicating some of the hardware, the logic circuit of FIG. 5 can be made to calculate $O_{new}$ in a single clock cycle. The circuit could be arranged to calculate all the final intermediate masks $I_p$ and sum them in a single cycle to produce the new output mask $O_{new}$. The calculation performed is a that exemplified in FIGS. 2, 3 and 4 where the column summation of all $I_p$ masks is performed to produce $O_{new}$. In this embodiment, all 18 $I_p$ masks would always be present for summation, even if some of them were simple masks with all bits set to zero.

The invention claimed is:

1. A method of creating a new output mask for a m-sequence generator, comprising creating an intermediate mask for each bit set in an existing output mask and performing modulo-2 summation on all the intermediate masks produced to create the new output mask, wherein each intermediate mask is created by shifting a shift template by an offset equal to the offset of the corresponding set bit in the existing output mask.

2. A method according to claim 1, wherein each intermediate mask comprises an aligned portion aligned with the new output mask and the new output mask is produced through modulo-2 summation of all the aligned portions.

3. A method of creating a new output mask for a m-sequence generator, comprising creating an intermediate mask for each bit set in an existing output mask and performing modulo-2 summation on all the intermediate masks produced to create the new output mask, wherein each intermediate mask is created by shifting a shift template by an offset equal to the offset of the corresponding set bit in the existing output mask, each intermediate mask comprises an aligned portion aligned with the new output mask and the new output mask is produced through modulo-2 summation of all the aligned portions and, if an intermediate mask has beyond its aligned portion an excess portion containing one or more set bits, then said one or more excess portion set bits are used to influence the effect of the intermediate mask on the new output mask.

4. A method according to claim 3, wherein said one or more excess portion set bits are used to adjust the new output mask after their intermediate mask has taken part in said summation.

5. A method according to claim 3, wherein said one or more excess portion set bits are used to adjust the new output mask at the same time as their intermediate mask takes part in said summation.

6. A method according to claim 3, wherein said one or more excess portion set bits are used to adjust their intermediate mask before it takes part in said summation.

7. A method according to claim 3, wherein the influence of said one or more excess portion set bits is determined by the nature of a feedback arrangement in the generator.

8. Apparatus for creating a new output mask for a m-sequence generator comprising a calculator for creating an intermediate mask for each bit set in an existing output mask and a combiner for performing modulo-2 summation on all the intermediate masks produced to create the new output mask, wherein the calculator produces each intermediate mask by shifting a shift template by an offset equal to the offset of the corresponding set bit in the existing output mask.

9. Apparatus according to claim 8, wherein each intermediate mask comprises an aligned portion aligned with the new output mask and the combiner is arranged to produce the new output mask through modulo-2 summation of all the aligned portions.

10. Apparatus for creating a new output mask for a m-sequence generator comprising a calculator for creating an intermediate mask for each bit set in an existing output mask and a combiner for performing modulo-2 summation on all the intermediate masks produced to create the new output mask, wherein the calculator produces each intermediate mask by shifting a shift template by an offset equal to the offset of the corresponding set bit in the existing output mask, each intermediate mask comprises an aligned portion aligned with the new output mask and the combiner is arranged to produce the new output mask through modulo-2 summation of all the aligned portions and, where an intermediate mask has beyond its aligned portion an excess portion containing one or more set bits, the combiner is arranged to use said one or more excess portion set bits to influence the effect of the intermediate mask on the new output mask.

11. Apparatus according to claim 10, wherein the combiner is arranged to use said one or more excess portion set bits to adjust the new output mask after their intermediate mask has taken part in said summation.

12. Apparatus according to claim 10, wherein the combiner is arranged to use said one or more excess portion set bits to adjust the new output mask at the same time as their intermediate mask takes part in said summation.

13. Apparatus according to claim 10, wherein the combiner is arranged to use said one or more excess portion set bits to adjust their intermediate mask before it takes part in said summation.

14. Apparatus according to claim 10, wherein the combiner is arranged to influence the new output mask with said one or more excess portion set bits in a manner determined by the nature of a feedback arrangement of the generator.

15. A computer readable medium containing computer-executable instructions for causing data processing apparatus to perform a method of creating a new output mask for a m-sequence generator, the method comprising creating an intermediate mask for each bit set in an existing output mask and performing modulo-2 summation on all the intermediate masks produced to create the new output mask, wherein each intermediate mask is created by shifting a shift template by an offset equal to the offset of the corresponding set bit in the existing output mask.

* * * * *

UNITED STATES PATENT AND TRADEMARK OFFICE

CERTIFICATE OF CORRECTION

PATENT NO. : 7,053,800 B2
APPLICATION NO. : 10/487637
DATED : May 30, 2006
INVENTOR(S) : Fisher-Jeffes It is certified that error appears in the above-identified patent and that said Letters Patent is hereby corrected as shown below:

Title Page, Item (73) Assignee:
Delete "Analog Devices, Inc.,"
Insert -- Analog Devices, B.V. --.

Signed and Sealed this

Twenty-ninth Day of May, 2007

JON W. DUDAS
*Director of the United States Patent and Trademark Office*